(12) United States Patent
Bucher et al.

(10) Patent No.: US 7,653,341 B2
(45) Date of Patent: Jan. 26, 2010

(54) LOGGING OF RADIO LISTENING AND INTERACTIVITY

(75) Inventors: Timothy Bucher, Los Altos, CA (US); Timothy T. Sullivan, Portola Valley, CA (US)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 11/754,846

(22) Filed: May 29, 2007

(65) Prior Publication Data

US 2007/0283008 A1 Dec. 6, 2007

Related U.S. Application Data

(60) Provisional application No. 60/803,480, filed on May 30, 2006.

(51) Int. Cl.
*H04H 60/33* (2008.01)
*H04H 60/09* (2008.01)
*H04H 40/00* (2008.01)
*H04M 3/42* (2006.01)
*H04M 3/00* (2006.01)
*G06F 17/30* (2006.01)

(52) U.S. Cl. ............... 455/2.01; 455/3.04; 455/3.06; 455/414.1; 455/418; 705/10

(58) Field of Classification Search ........... 455/2.01, 455/3.01–3.06, 405–409, 418–420, 463, 455/517, 550.1, 556.2, 560–561, 566, 41.2–41.3, 455/73, 410–411, 414.1–414.2, 415, 427, 455/500, 514, 524–525, 557; 379/92.01–92.04; 725/9–13, 16, 18–20, 42, 45–49, 62–63; 709/202–203, 219, 224, 200, 206, 226, 231, 709/244; 715/737–742, 744–747; 705/10, 705/12, 15, 14, 18
See application file for complete search history.

(56) References Cited

U.S. PATENT DOCUMENTS

| | | | |
|---|---|---|---|
| 6,947,922 B1* | 9/2005 | Glance | 707/3 |
| 7,032,178 B1* | 4/2006 | McKnight et al. | 715/747 |
| 7,228,305 B1* | 6/2007 | Eyal et al. | 707/100 |
| 7,310,350 B1* | 12/2007 | Shao et al. | 370/466 |
| 7,515,873 B2* | 4/2009 | Brown et al. | 455/3.01 |
| 2001/0016834 A1 | 8/2001 | Yamanaka et al. | |
| 2002/0021665 A1* | 2/2002 | Bhagavath et al. | 380/229 |
| 2002/0138630 A1* | 9/2002 | Solomon et al. | 709/228 |
| 2003/0110485 A1 | 6/2003 | Lu et al. | |
| 2005/0022239 A1* | 1/2005 | Meuleman | 725/46 |
| 2006/0168609 A1* | 7/2006 | Chen | 725/9 |

* cited by examiner

*Primary Examiner*—Meless N Zewdu
(74) *Attorney, Agent, or Firm*—Workman Nydegger

(57) ABSTRACT

A system for collecting, evaluating and using usage activity includes one or more media devices and a network with a ratings service. A media device includes a logging service for logging usage activity when media content is accessed and played, shared, deleted and/or stored. When a connection to the network is present, the usage activity is transmitted to the ratings service. The ratings service evaluates the usage activity and prepares a usage report, which can be transmitted to one or more content providers and/or can be used to refine programming content and/or influence advertising decisions. A content provider can collect votes by sending a list of possible song choices to media devices and receiving vote data collected by logging services on the media devices. The vote data is evaluated and a vote report is prepared that can be used to refine programming content and/or to influence advertising decisions.

20 Claims, 4 Drawing Sheets

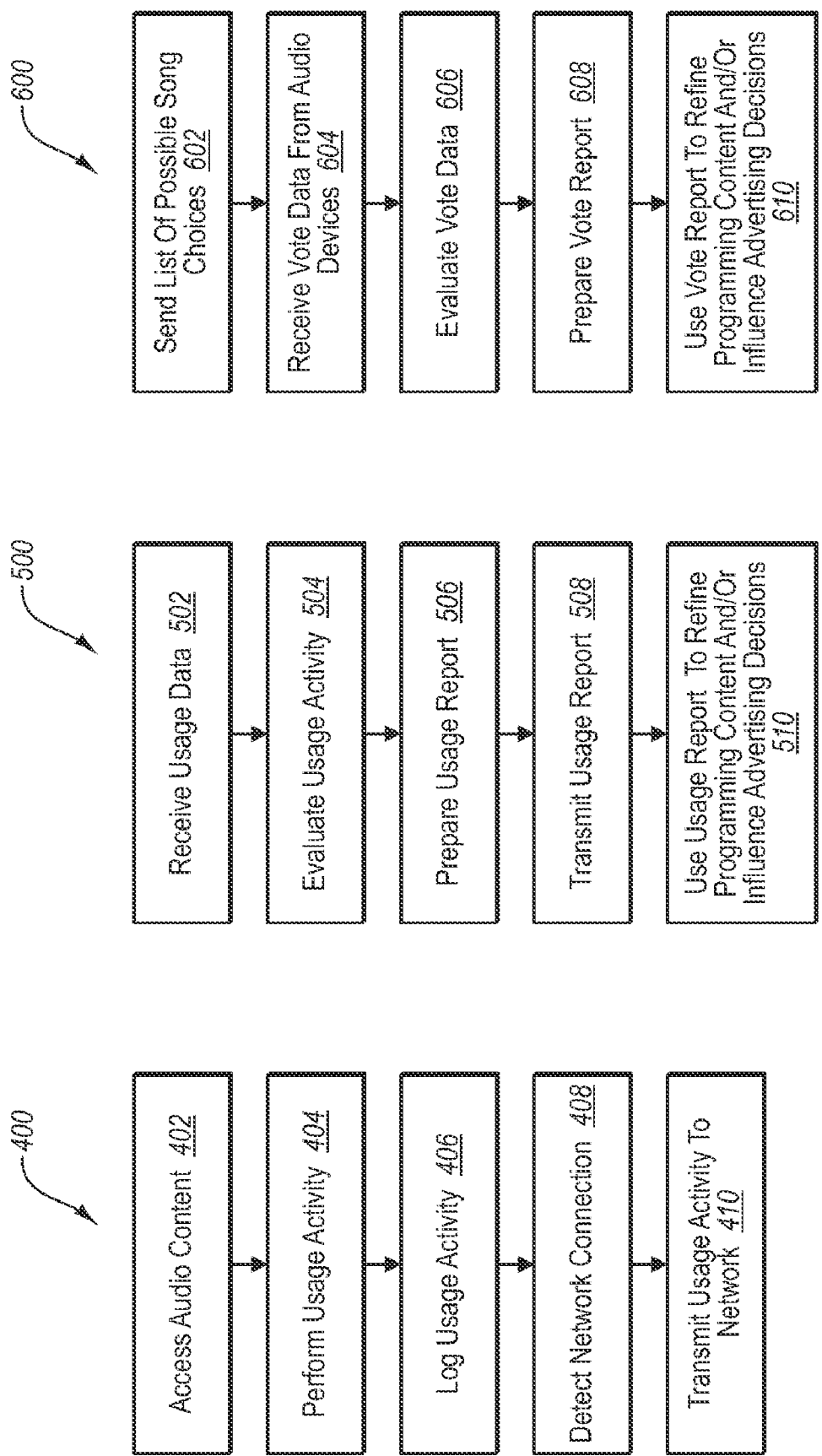

LOGGING OF RADIO LISTENING AND INTERACTIVITY

CROSS-REFERENCE TO RELATED APPLICATIONS

This application claims the benefit of U.S. Provisional Patent Application Ser. No. 60/803,480 filed May 30, 2006, which application is incorporated herein by reference in its entirety.

BACKGROUND OF THE INVENTION

1. The Field of the Invention

The present invention relates generally to the fields of radio and network communications. More particularly, the present invention relates to systems and methods for logging and collecting usage activity from media devices.

2. The Relevant Technology

The music industry has been revolutionized with the development of digital media content and methods for distributing and accessing digital media content. For example, satellite radio, or Digital Audio Radio Service (DARS), is the broadcast of digital audio programming via satellites directly to subscribers or users. Through satellite radio, subscribers can receive high quality, uninterrupted, digital data such as radio over many different radio channels. Digital radio content includes, for example, digital quality music, talk radio, sports, news, weather, and the like. More traditionally, terrestrial broadcast media such as FM and AM radio allow radio signals to be widely broadcast to listeners having FM or AM receivers.

Often, audio content providers rely on ratings companies that monitor the audio activity of a few listeners and use statistical analysis methods to scientifically estimate the total number of listeners for content. Satellite radio stations, commercial radio stations and other content providers may use this data to adjust advertising rates and/or to refine programming content.

Currently, there is no efficient means for monitoring a listener's audio activity, especially when the user is using a mobile audio device. The monitoring performed by ratings companies typically includes sending a listening diary to a listener, in which the listener can manually write down their activity. However, this method has varying levels of inaccuracy depending on how committed a listener is to accurately recording audio activity. In addition, while a listener can transmit this information via, for example, email, an inherent time lag occurs which renders this information less effective for real-time analysis or decision making.

Accordingly, there currently exists a need for improved methods and systems of monitoring a listener's audio activity.

BRIEF SUMMARY OF THE INVENTION

The present invention overcomes the above and other problems by enabling the logging of usage activity on a media device of a user. Initially, a media device accesses media content from any of a variety of sources, including local memory and content providers in a network. A usage activity is performed on the media content, which can include selecting the media content for play, selecting media content for storage in local memory, and sharing the media content with others. A logging service logs the usage activity and after detecting a network connection, transmits the usage activity via the network connection to a ratings service.

According to another embodiment of the invention, a ratings service collects and evaluates the monitored usage data. Usage activity logged by a media device is received by the ratings service and evaluated based on any of a number of factors, including time, similar activities, geographic area, genre of music content, user demographics, etc. The evaluated usage activity can be used to prepare one or more reports based on any categorization. The reports can be transmitted to one or more media content providers in real time (or close to real time). Alternately or additionally, the reports can be used by the ratings service or the media content providers to refine programming content, to make advertising decisions, or any combination of the two.

According to another embodiment of the invention, a content provider collects and evaluates the monitored usage data in the course of conducting a vote or poll. The content provider sends a list of possible media choices (e.g., song choices) to a plurality of media devices. The list can be presented visually in a display of a media device and/or rendered audibly by the media device. The users vote on particular media content and this information is logged on the media devices and transmitted by the media devices to be received by the content provider. The content provider evaluates the vote data (e.g., counts the votes) and prepares a vote report, which can be used by the content provider to influence advertising decisions refine programming content, or for any other purpose.

Embodiments within the scope of the present invention include a media device with an audio application for accessing audio content from local memory and/or from content providers via a network. The media device also includes storage (e.g., local memory) for storing media content and a network interface for connecting to a network to transmit usage data and to receive media content from the content providers. Additionally, the media device includes a logging service for logging usage data.

These and other advantages and features of the present invention will become more fully apparent from the following description and appended claims, or may be learned by the practice of the invention as set forth hereinafter.

BRIEF DESCRIPTION OF THE DRAWINGS

To further clarify the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates an example method for logging usage activity on a media device according to one embodiment of the invention.

FIG. 5 illustrates an example method for receiving and evaluating usage data according to one embodiment of the invention.

FIG. 6 illustrates an example method for receiving and evaluating vote data according to one embodiment of the invention.

DETAILED DESCRIPTION OF THE PREFERRED EMBODIMENTS

In the following detailed description of the various embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The present invention is directed to systems and methods for monitoring and reporting the listening activity of users of networked devices, including media devices, and using such information to dynamically refine delivery of media content as well as use for other business uses, such as advertising, giving away promotional content, and other business and/or non business uses. While many of the examples discussed herein refer to audio content, one skilled in the art will appreciate that the principles of the present invention can also be applied to other media content, such as audiovisual content.

Figure 1:
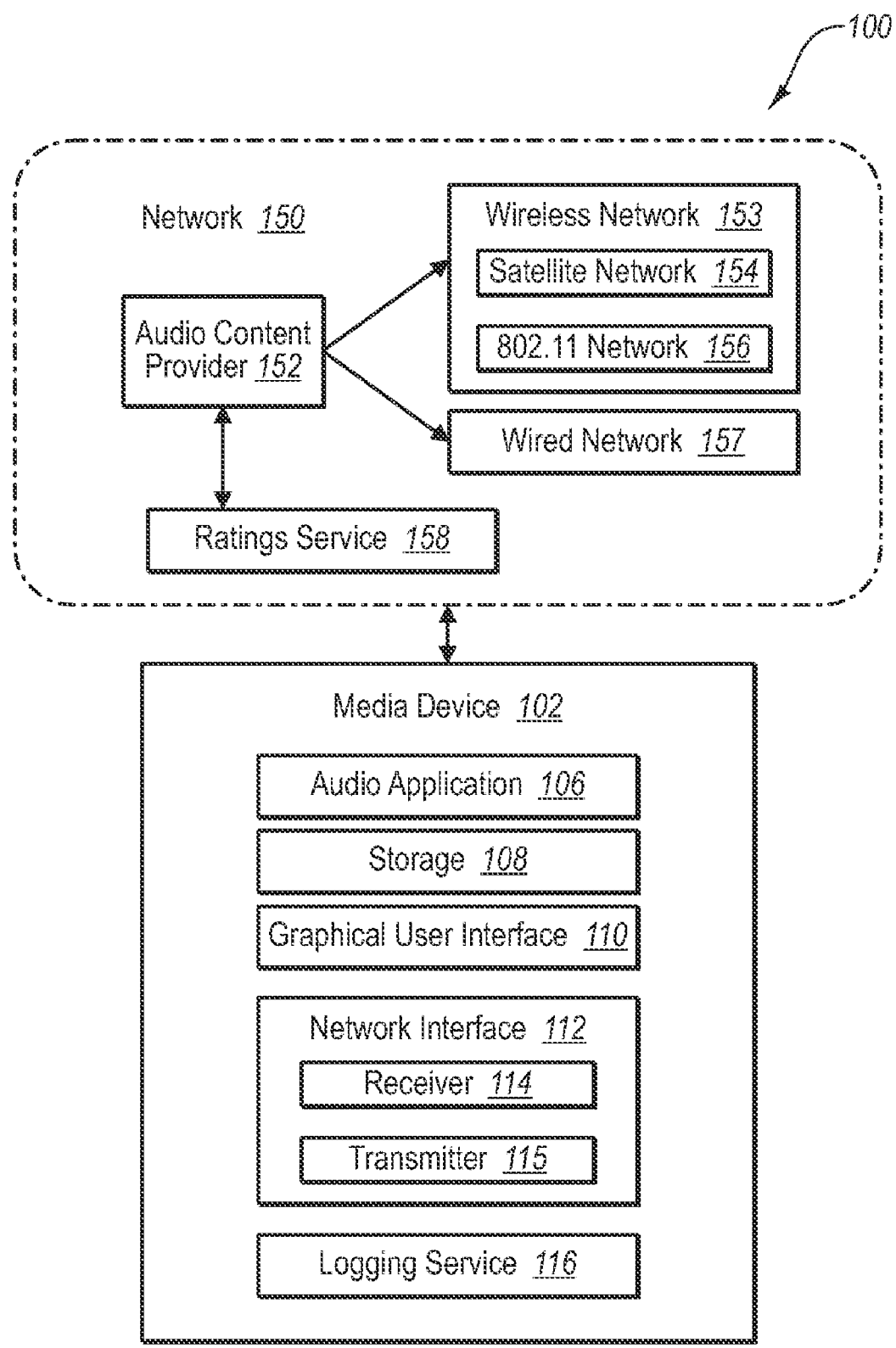
FIG. 1 illustrates an example environment for implementing features of the present invention according to one embodiment of the invention.

With reference to FIG. 1, an example environment 100 for monitoring user's audio activity is illustrated. Environment 100 includes a device 102 in communication with a network 150. In one embodiment, media device 102 is a special purpose audio device configured to play audio content, such as a portable receiver in an automobile, a home stereo, or a personal, portable audio device. In another embodiment, media device 102 can be a general-purpose device such as a desktop computer, laptop computer, personal data assistant, cellular phone, or other device that may have other uses in addition to playing media content. For example, the media device 102 can be configured as a plug and play device into a computer. The device 102 may also be able to perform other media content such as video content, world wide web content, television content, text content, and the like or any combination thereof. The device may also be a video player, personal digital assistant, satellite radio, and the like or any combination thereof.

In this example, the device 102 is discussed with reference to audio content. The device 102 includes an application 106 configured to receive and play audio content or other content. Audio content is saved in storage 108 for access by the audio application 106, depending on copyright issues and/or according to rights associated with the audio content. For example, a content provider may also apply rights that are not necessarily related to copyright issues. The device 102 can play audio content stored on the device. In addition, some audio content can be played by audio application 106 without being stored in storage 108, such as streamed content. A graphical user interface 110 allows a user to select audio content to receive and/or store and also which audio content to play. Graphical user interface 110 can also provide the user with other input options such as deleting and sharing audio content. In addition, in one embodiment the user can select via graphical user interface 110 whether to activate a logging service (described below), while in another embodiment activation of the logging service is automatic.

The audio application 106 accesses audio content from network 150 via a network interface 112. Network interface 112 can connect media device 102 to network 150 via a wired or wireless connection. Audio content can be accessed over network 150 from any of a number of audio content providers 152.

In one embodiment, audio content provider 152 sends audio content via a wireless network 153. For example, wireless network 153 can include a satellite radio provider which uses digital radio to send signals that are broadcast by a satellite network 154 including one or more communications satellites. Satellite radio has gained recent popularity because listeners can follow a single channel regardless of location as long as they are in range of a transmitter. In embodiments where media device 102 is capable of receiving satellite radio signals, network 150 includes systems for transmitting satellite radio transmission signals from the audio content provider 152 to a satellite (not shown) which transmits the signals at a certain frequency. In addition, network 150 may include local repeaters for transmitting the satellite signals where they are more likely to be blocked.

Further, where media device 102 is configured to receive wireless satellite transmissions, network interface 112 includes a receiver 114, which includes an antenna for receiving satellite communication transmissions. Audio application 106 and/or network interface 112 further includes modules for decoding and playing satellite radio transmission signals, the modules enabling the application 106 and/or interface 112 to communicate with one or more proprietary radio satellite systems that may use proprietary codecs for audio data compression, proprietary modulation techniques, and/or proprietary methods for encryption and conditional access. Satellite radio also usually transmits program-associated data (PAD or metadata), with the artist and title of each song or program and the name of the channel.

In another embodiment, wireless network 153 can include any one or more of a Bluetooth wireless network and an IEEE 802.11 standard wireless network 156. The IEEE 802.11 standard covers a family of wireless protocols such as, but not limited to WiFi and the like. The wireless access points in the 802.11 network 156 broadcast SSID (Service Set Identifier, Network name) via packets called beacons. The network interface 112 selects the wireless access point to which to connect. In some cases, the network interface 112 can select between two wireless access points based on signal strength.

The 802.11 network 156 thus allows media device 102 to receive digital content from, for example, the world wide web, a LAN, or other network. In one embodiment, the satellite radio network 154 described above can connect to an 802.11 wireless access point to allow the media device 102 to receive satellite radio content through 802.11 network 156. Further, using 802.11 network 156, other forms of media content can also be sent to media device 102, including, but not limited to, terrestrial radio broadcast (e.g. AM and FM) and video (e.g. television.). In some cases, 802.11 network 156 also allows connectivity in peer-to-peer mode, which enables media devices 102 to connect directly with each other.

In yet another embodiment, network 150 can include a wired network 157 that allows media device 102 to receive media content via a wired network. Such wired networks are well known in the art and can be connected to other wireless networks such as satellite network 154 and/or 802.11 network 156. One of skill in the art can appreciate, with the benefit of the present disclosure, that the device 102 may be able to receive content from other RF networks such as cellular networks, AM networks, FM networks, and DAB networks.

Media device 102 also includes a logging service 116 which monitors and captures usage activity automatically and without user intervention. The logging service 116 can monitor what channel is played, how long a channel is played, specific audio content that was played, audio volume changes, whether audio content was downloaded, and when and to where channels are switched. As used herein, the term "channel" is used to refer to any source of audio content such as, but not limited to, a transmission from network 150 which is played directly by media device 102 while it is being delivered (i.e., streaming), a transmission from network 150 that is stored on media device 102, stored audio content that is accessed from storage 108 and played by media device 102, playing of other content that is not strictly audio content such as, but not limited to, world wide web and video content, and the like. In one embodiment where the audio content is transmitted to media device 102 in digital format, the logging service 116 can store the metadata associated with the audio content and an associated time stamp.

The logging service 116 on the media device 102 also monitors the system capabilities of the media device 102 such as, but not limited to, the network used to receive the audio content (e.g., satellite network 154, 802.11 network 156 or wired network 157), the bandwidth provided by the network interface 112 and/or networks 154, 156, 157, and other system ability such as presence of a graphical user interface 110, browser application, instant messaging application, email application, voice mail application, text messaging application, and the like.

In one embodiment, logging service 116 on the media device 102 detects the presence of the network 150 and sends the monitored data to ratings service 158 in real-time or periodically. In another embodiment, the logging service 116 can use storage 108 to maintain data related to the logging service even when transmitting in real-time. Further, the logging service 116 can store data in storage 108 when the media device 102 is outside of the network 150 and then transmit the information when the presence of network 150 is detected. Thus, in one embodiment, network interface 112 on the media device 102 includes a transmitter 115 for sending the data to network 150. Broadly, network interface 112 includes any hardware or software necessary to communicate with network 150 depending on the user's selected network (i.e., wireless network 153 and/or wired network 157).

Network 150 includes a ratings service 158 that collects the data from one or more media devices 102. The data collected may be anonymized at time of collection to disallow the ability to map listening behavior to a particular device, or device-specific mapping may be maintained. In a hybrid of these two approaches, a device's usage data is mapped algorithmically to a new, unique device identifier so that the usage dataset cannot, by itself, be used to map listening behavior to an identifiable device, but all usage by a particular device can still be tracked and analyzed. In one embodiment, the data is collected, anonymized, aggregated, and/or analyzed to determine usage patterns on a real-time basis or historical basis. User data can then be used to determine popularity of certain audio content, popular times of day for user use, and whether these results are affected by the particular bandwidth available. Channel changes may indicate preference for other audio content or dislike of some audio content, and may assist the rating service 158 to determine which specific audio content is liked and disliked. Further, the user data can be broken down by geographic area and other demographic information (e.g., sex, age, music genre), etc.

Geographic and/or demographic information can be collected in any of a number of ways. For instance, user geographic/demographic information can be collected by an application or module on the device 102 that allows specification of a home zip code, age, and other information by the device user. Alternately or additionally, geographic and/or demographic information can be collected from a backend service billing system (not shown). In this case, the ratings service may communicate with the backend service billing system to collect information including the billing zip code of a particular device from which data is collected.

The ratings service 158 can transmit the user data to the audio content provider 152 which can use the data to refine audio content programming. For example, the audio content provider 152 may increase the frequency of playing a certain song, adjust the content for better bandwidth distribution, play certain songs more frequently in certain geographical areas, and the like.

The audio content provider 152 may also use the ratings for other business purposes, such as to determine advertising rates, give away promotional content, and the like or any combination thereof. For example, the audio content provider 152 may charge a higher rate at certain times of day where it is proven that more users are listening than at times when less user activity is shown. Because the data includes analysis of millions of users, rather than a select few who manually record their activity, the data is more accurate. Further, because data can be analyzed close to real time, the advertising rates may be adjusted on a real-time basis. In addition, since user activity can be broken down by different activities, such as streaming versus downloading, the advertising may vary depending on the type of user behavior. Thus, information about user activity is particularly useful to advertisers, and is much more accurate and complete than conventional methods of measuring listening activity, which typically involves the use of a written diary by a few selected listeners.

Figure 2:
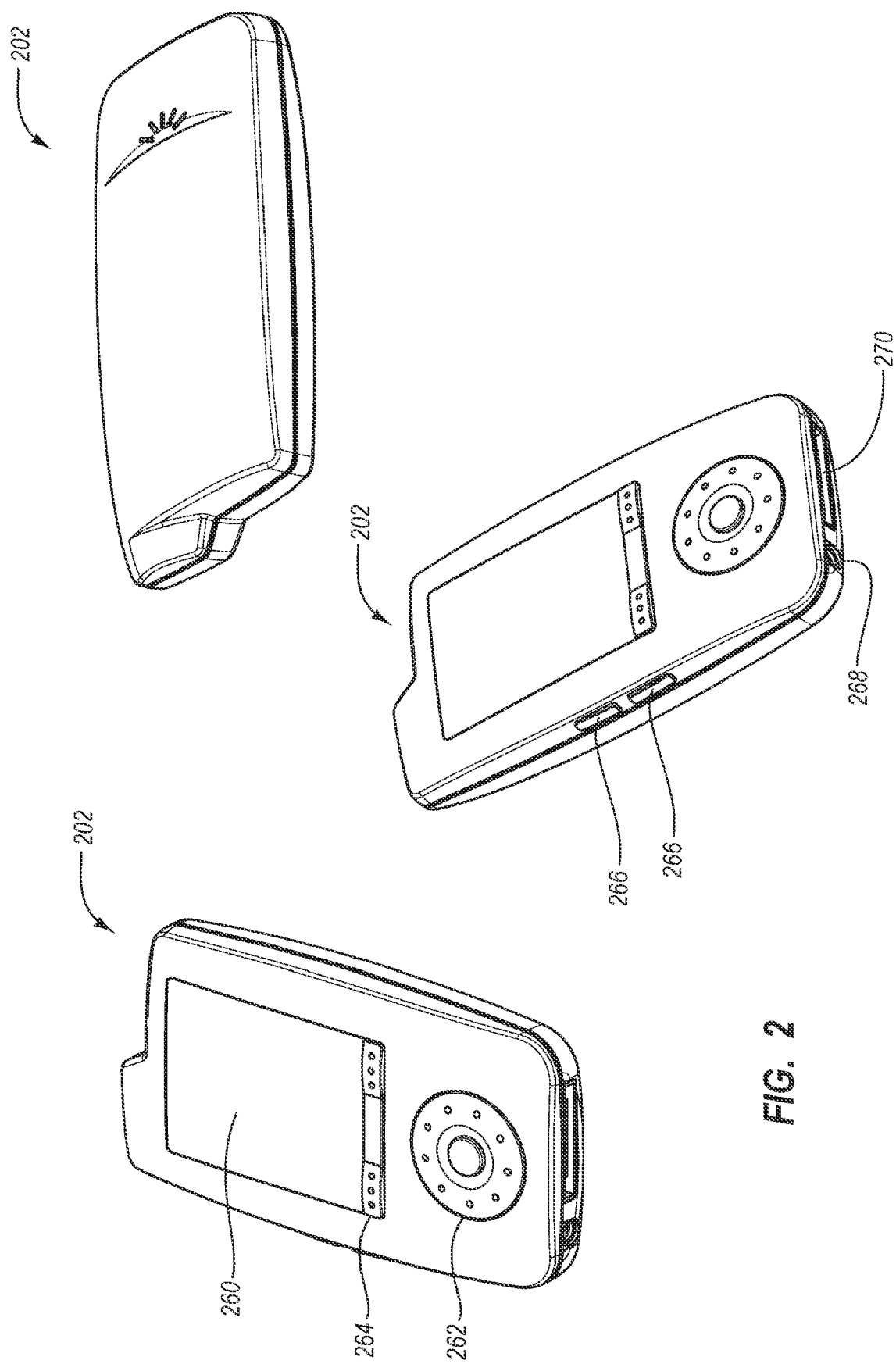
FIG. 2 illustrates various perspective views of an example media device according to one embodiment of the invention.

FIG. 2 illustrates various perspective views of one embodiment of a media device 202 with display and navigation mechanisms that can be used in conjunction with the features of the present invention. The media device 202 may correspond to the media device 102 of FIG. 1. In this example, media device 202 is a hand-held device, although larger devices can also be used. The media device 202 includes a display 260 having various display methods. A user can interact with media device 202 using a touchpad 262, electro-mechanical keys on a keypad, such as arrow keys and alphanumeric keys, soft keys 264 on display 260, a navigation wheel, other device buttons 266, a remote control device (not shown) associated with the media device 202, voice commands, or by moving the communication device in a particular way. The media device 202 may also include port 268 for connecting audio headgear and port 270 for connecting the media device 202 to a docking station or connector for charging the media device. Of course, media device 202 can include any of a variety of configurations and designs that are contemplated within the scope of the present invention.

Figure 3:
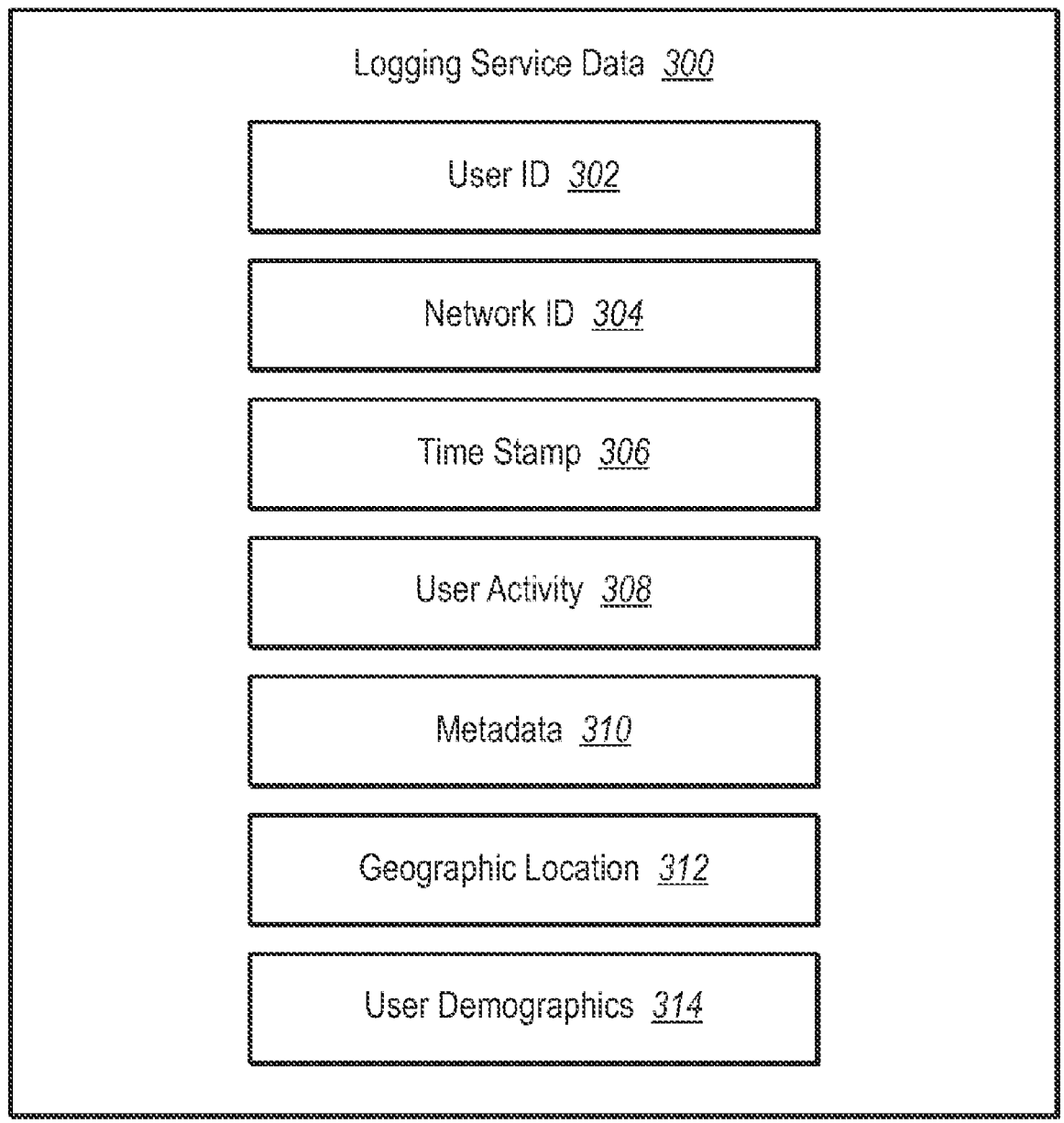
FIG. 3 illustrates example data to be included in logging service data according to one embodiment of the invention.

FIG. 3 illustrates an example block diagram illustrating example data 300 that can be transmitted and/or stored by the logging service 116 of FIG. 1. Service data 300 can include user ID 302, network ID 304, time stamp 306, type of activity 308 (e.g., streaming, downloading, playing), metadata 310 relating to a particular media content, geographic location 312, and user demographics 314. Service data 300 can additionally include a device ID instead of or in addition to the user ID 302. It will be appreciated that some information can be obtained simply by having a user ID 302 or a device ID included in the transmitted data. For example, in FIG. 1, the ratings service 158 and/or media content provider 152 may actually store user demographic information or profiles remote from the media device 102 and may be able to match user demographics upon receiving the user ID 302.

FIG. 4 illustrates an example method 400 for performing aspects of the present invention from the point of view of the media device 102 of FIG. 1. At 402, the media device 102 accesses audio content. In one embodiment, this includes media device 102 connecting to and receiving audio content from network 150 via network interface 112. As discussed above, the audio content can be accessed via any suitable wired or wireless network. The user may use graphical user interface 110 to initially select the network and the specific audio content provider. Another embodiment also includes media device 102 accessing audio content from storage 108, for example, using graphical user interface 110 or manual buttons on the media device.

At 404, after the audio content is accessed, the media device 102 performs usage activities on the audio content. The user may use graphical user interface 110 to select to play the accessed audio content. The user may select to store the accessed audio content in storage 108. The user may also use graphical user interface 110 to share content with other listeners.

At 406, the logging service 116 identifies the user's usage activity. In one embodiment, this can include storing user activity in storage 108 until the logging service 116 can send the information to network 150. In another embodiment, this includes simply identifying the user usage activity. Thus, the term "logging" does not necessarily require a storage element.

At 408, the logging service 116 detects a network connection to network 150.

At 410, if a network connection is detected, the logging service 116 transmits the usage activity to network 150. In one embodiment, the logging service 116 may maintain the data in storage 108 for an amount of time until network 150 is detected. In another embodiment, if the media device 102 is already connected to the network 150, the logging service 116 transmits the data immediately subsequent to logging the activity and can, optionally, store such usage activity in storage 108. In one embodiment, the data transmitted to the network 150 may include information shown in and discussed with respect to FIG. 3, such as, but not limited to, device ID, user ID 302, network ID 304, time stamp 306, type of activity 308 (e.g., streaming, downloading, playing), metadata 310 relating to a particular media content, geographic location 312, and user demographics 314.

FIG. 5 illustrates an example method 500 for performing aspects of the present invention from the point of view of the ratings service 158 of FIG. 1. At 502, ratings service 158 receives logging usage data containing usage activity from one or more media devices 102. At 504, rating service 158 evaluates the usage activity. This can include evaluating the activity based on time, similar activities, geographic area, genre of music content, demographics, and the like. Evaluating the usage activity can also include anonymizing and/or aggregating the usage data from a plurality of media devices 102.

At 506, the ratings service 158 can prepare reports to send to audio content provider 152 based on any categorization that the audio content provider desires.

At 508, the ratings service 158 sends the reports to the audio content provider 152. In one embodiment, as mentioned above, the audio content provider 152 and ratings service 156 may be the same entity. In one embodiment, the report is prepared and submitted as close to real time as possible so that the audio content provider 152 can make decisions based on the report.

At 510, the audio content provider 152 uses the information to refine its programming content. Or, the audio content provider 152 may use the information to negotiate advertising rates with advertising, perhaps increasing rates during times and/or in regions where it is proven that listeners are more active and decreasing rates in regions and/or at times when listeners are less active. Alternately or additionally, the audio content provider 152 can use the information for any other business purpose.

While the usage results are not definitive evidence of whether users actually listened to certain audio content, the present invention provides more of a certainty that the users at least accessed such audio content which presents a statistically high likelihood that users actually listened to the audio content. Thus, the present invention provides a higher level of accuracy rather than relying on sales or manual listening records to guess as to what listeners want to hear.

FIG. 6 illustrates an example method 600 for performing aspects of the present invention from the point of view of the audio content provider 152 of FIG. 1. In one embodiment, network 150 (802.11 network 156, in particular) can allow peer-to-peer connectivity. Alternately or additionally, the network 150 enables the logging of interactive input from a media device. For example, in the present embodiment, the interactive input or user activity being logged is a vote made by the user of a media device.

At 602, the audio content provider 152 sends a list of possible media content choices (e.g., songs) to be played in the next hour. The list can be received at media device 102 by network interface 112 and played by audio application 106 and/or displayed on graphical user interface 110. The user listens to or views the selection and then inputs his or her preference in graphical user interface 110 (or some other input means such as manual buttons). The preferences are detected by logging service 116 which sends the user preferences back to ratings service 158 and/or audio content provider 152.

In this embodiment, similar data such as that illustrated in FIG. 3 can be returned to audio content provider 152. Data 180 that is transmitted back to the audio content provider 152 can include device ID, user ID 302, network ID 304, time stamp 306, type of activity 308 which would reflect a vote from the user, metadata 310 indicating the user selection of a particular media content from the list of song choices, geographic location 312, and user demographics 314.

At 604, audio content provider 152 receives the logging data (i.e., vote data), and optionally aggregates the results from multiple users. At 606, audio content provider 152 evaluates the vote data from among multiple media devices 102, which may include aggregating the results from the multiple media devices. At 608, audio content provider 152 prepares a vote report.

Using the vote report, at 610, audio content provider uses the results to refine its programming content. For example, audio content provider uses the results to play one or more of the selections. Audio content provider 152 may play the top voted song, or may play the songs from least preferred to most preferred as voted upon by the listeners. At 610, the audio content provider 152 may further use the results to influence advertising decisions. For example, the advertising rate may be scaled based on the number of listeners that respond to the poll, indicating that those listeners who voted for the top selection are most likely to be listening to the radio immediately before and/or after the song and so will likely be listening to any advertising immediately before and/or after the top song selection is played. Alternately or additionally, at 610 the audio content provider may use the results for any other business purpose. For instance, the audio content provider could award promotional content to a particular voter, e.g., the next voter, the $100^{th}$ voter, the last voter, etc. In method 600, it will be appreciated that the steps 602 through 610 can be performed by audio content provider 152 and/or rating service 158 depending on the desired configuration.

Embodiments of the present invention include dedicated devices or systems that include both hardware and/or software components. Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Those skilled in the art will appreciate that the invention may be practiced with other computer system configurations, including hand-held devices, multi-processor systems, microprocessor-based or programmable customer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for logging usage activity on a media device, the media device configured to communicate with a network, the method comprising:
   accessing media content into with the media device that has access to the network;
   performing a usage activity on the media content with the media device;
   monitoring the usage activity on the media content, wherein the usage activity is monitored for information based at least in part on one of source of the media content, duration of the media content, audio volume change of the media content, download of the media content, metadata associated with the media content, and time stamps associated with a switch between a plurality of sources of media content;
   logging the monitored usage activity at the media device, wherein the media device is configured to log the monitored usage activity automatically and without user intervention;
   detecting a network connection to the network; and
   transmitting the monitored usage activity via the network connection to a ratings service, wherein the ratings service receives the usage activity from a plurality of media devices and uses the usage activity to rate the media content accessed by the media devices.

2. The method of claim 1, further comprising selecting the network from which the media content can be accessed.

3. The method of claim 2, wherein accessing the media content comprises:
   connecting to the network from which the media content can be accessed;
   selecting the media content; and
   receiving the media content from the network.

4. The method of claim 1, wherein the media content is accessed from storage on the media device.

5. The method of claim 1, wherein the network connection includes one or more of a wired network connection and a wireless network connection.

6. The method of claim 1, wherein performing usage activity on the media content comprises one or more of:
   selecting the media content for playback;
   selecting the media content for storage on the media device; and
   sharing the content.

7. The method of claim 1, further comprising storing the usage activity in storage of the media device.

8. The method of claim 1, wherein the usage activity transmitted via the network connection includes one or more of: a device ID corresponding to the media device; a user ID corresponding to a user of the media device; a network ID; a time stamp; a type of activity including streaming, downloading or playing of media content; metadata relating to a particular media content; geographic location; and user demographics.

9. In a ratings service within a network, a method for collecting usage data from one or more media devices, the method comprising:
   receiving, at the ratings service, usage data relating to media content accessed on one or more media devices;
   evaluating the usage data to determine usage patterns;
   preparing a usage report based on the evaluated usage data; and
   performing one or more of: sending the report to a media content provider; and using the report for a business purposes;
   wherein the usage data comprises of:
   device identifiers corresponding to the one or more media devices;
   user identifiers corresponding to users of the one or more media devices;
   network identifiers corresponding to particular networks from which the media content is accessed on the one or more media devices;
   time stamps relating to when the media content is accessed on the one or more media devices;
   user activity, including channels accessed by the one or more media devices, amounts of time the channels are accessed by the one or more media devices, volume changes, and particular media content played by the one or more media devices;
   metadata associated with the media content accessed on the one or more media devices;
   geographic locations of the one or more media devices when the media content is accessed; and
   user demographics corresponding to the users of the one or more media devices.

10. The method of claim 9, wherein the evaluating the usage data to determine the usage patterns includes one or more of: anonymizing usage data from one or more media devices; and aggregating usage data from a plurality of media devices.

11. The method of claim 9, wherein the usage patterns include one or more of popularity of particular media content, and popular times of day for user use.

12. The method of claim 9, wherein the usage report is prepared according to one or more categorizations provided to the ratings service by the media content provider.

13. The method of claim 9, wherein using the report for a business purpose comprises using the report to: refine programming content provided by the ratings service to the one or more media devices, influence advertising rates charged by the ratings service; award promotional content to one or more users associated with the one or more media devices; and any combination thereof.

14. The method of claim 13, wherein using the report to influence advertising rates charged by the ratings service comprises using the report to negotiate advertising rates with an advertiser, including increasing rates for times and regions where the report indicates that users of the one or more media devices are more active, decreasing rates for times and regions where the report indicates that users of the one or more media devices are less active, or both.

15. The method of claim 9, wherein user demographics for a corresponding media device are collected from one or more of:
    an application on the corresponding media device; and
    a service billing system associated with the corresponding media device.

16. In a content provider within a network, a method of logging votes for a plurality of possible media content choices, the method comprising:
    transmitting, from the content provider, a list of possible media content choices to a plurality of media devices, each of the media devices being configured to present the list of possible media content choices to a user of each of said media devices and capture vote data from the user, the vote data indicating a user preference for at least one of the possible media content choices;
    receiving vote data from one or more of the media devices;
    evaluating the vote data, wherein the evaluation is based at least in part on source of the media content, duration of the media content, audio volume change of the media content, download of the media content, metadata associated with the media content and time stamp associated with a switch between a plurality of sources of media content;
    preparing a vote report based on the evaluated vote data; and
    using the vote report for one or more of:
        refining media content made available by the content provider to the plurality of media devices; and
        scaling advertising rates charged by the content provider.

17. The method of claim 16, wherein refining the media content made available by the content provider to the plurality of media devices comprises one or more of:
    playing a top rated media content choice from the list of possible media content choices; and
    playing all media content choices from the list of possible media content choices in order from least preferred to most preferred as indicated by the vote report.

18. The method of claim 16, wherein the list of possible media content choices comprises a list of possible song choices.

19. The method of claim 16, wherein evaluating the vote data comprises aggregating the vote data received from the one or more media devices.

20. The method of claim 16, wherein the scaling of advertising rates charged by the content provider is based on how many media devices the vote data is received from.

* * * * *

UNITED STATES PATENT AND TRADEMARK OFFICE
CERTIFICATE OF CORRECTION

| | | |
|---|---|---|
| PATENT NO. | : 7,653,341 B2 | Page 1 of 1 |
| APPLICATION NO. | : 11/754846 | |
| DATED | : January 26, 2010 | |
| INVENTOR(S) | : Timothy Bucher et al. | |

It is certified that error appears in the above-identified patent and that said Letters Patent is hereby corrected as shown below:

In Column 10, Line 38, in Claim 9, delete "purposes;" and insert -- purpose; --, therefor.

In Column 11, Line 32, in Claim 16, delete "devices" and insert -- device --, therefor.

Signed and Sealed this

Twenty-third Day of March, 2010

David J. Kappos
*Director of the United States Patent and Trademark Office*